United States Patent

Allington et al.

Patent Number: 6,106,877
Date of Patent: *Aug. 22, 2000

[54] METHOD OF TERMINATING ROASTING OF BULK MATERIALS IN REAL TIME ON BASIS OF OBJECTIVELY DETERMINED COLOR OF MATERIALS

[75] Inventors: Roger A. Allington, Santa Rosa; Philip A. Torbet, San Rafael, both of Calif.; Edward M. Granger, Rochester, N.Y.

[73] Assignee: Fresh Roast Systems, Inc., Petaluma, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/302,049

[22] Filed: Apr. 29, 1999

Related U.S. Application Data

[60] Provisional application No. 60/083,887, May 1, 1998.

[51] Int. Cl.[7] .................................................. A23F 5/00
[52] U.S. Cl. ........................ 426/233; 426/466; 426/467
[58] Field of Search ................................. 426/233, 231, 426/466, 467, 520; 99/331, 342, 476, 483

[56] References Cited

U.S. PATENT DOCUMENTS

| | | |
|---|---|---|
| 2,572,678 | 10/1951 | Torres . |
| 3,735,143 | 5/1973 | Langford . |
| 3,867,039 | 2/1975 | Nelson . |
| 4,110,485 | 8/1978 | Grubbs et al. ........................... 456/595 |
| 4,350,442 | 9/1982 | Arild . |
| 4,421,772 | 12/1983 | Munck et al. ........................... 426/231 |
| 4,494,314 | 1/1985 | Gell . |
| 4,707,138 | 11/1987 | Coatney ................................... 356/339 |
| 4,849,625 | 7/1989 | Camerini Porzi . |
| 4,860,461 | 8/1989 | Tamaki . |
| 5,034,609 | 7/1991 | Satake . |
| 5,062,066 | 10/1991 | Scher . |
| 5,158,798 | 10/1992 | Helbling . |
| 5,160,757 | 11/1992 | Kirkpatrick et al. ................... 426/467 |
| 5,385,083 | 1/1995 | Toyokura . |
| 5,724,882 | 3/1998 | Gallas . |
| 5,958,494 | 9/1999 | Tidland . |

FOREIGN PATENT DOCUMENTS

| | | |
|---|---|---|
| 446794A1 | 9/1991 | European Pat. Off. . |
| WO 9923888A1 | 5/1999 | WIPO . |

*Primary Examiner*—George C. Yeung
*Attorney, Agent, or Firm*—Townsend and Townsend and Crew LLP

[57] ABSTRACT

Bulk material formed by a multiplicity of individual moving particles is heat-treated by directing a light beam into an observation volume of the material and generating light reflections off at least one particle in the observation volume. A characteristic of the light reflections which is indicative of a desired extent to which the material is to be heat-treated is identified and the material is subjected to a heated environment and thereby heat-treated. The light reflections are monitored for the characteristic, and subjecting the material to the heated environment is ended in response to detecting the characteristic of the light reflections.

8 Claims, 3 Drawing Sheets

METHOD OF TERMINATING ROASTING OF BULK MATERIALS IN REAL TIME ON BASIS OF OBJECTIVELY DETERMINED COLOR OF MATERIALS

This application is a claims the benefit of U.S. Provisional Application No. 60/083,887, filed May 1, 1998, the disclosure of which is incorporated by reference.

BACKGROUND OF THE INVENTION

The present invention relates to objectively determining in real time the color of bulk material undergoing heat treatment, such as during roasting, to ensure an accurate, readily replicable end point for the process.

A variety of bulk materials, typically but not limited to food products such as nuts, kernels, beans, grains and the like, are subjected to heat treatment, i.e. roasting, to alter characteristics of the materials, such as taste, aroma, hardness, color, moisture content and the like. Roasting must be carried on until the desired characteristic(s) have been attained, but must then be quickly terminated to prevent an over-roasting and a resulting deterioration of the product. Determining the roasting end point, however, is difficult when dealing with bulk material that is in motion, e.g. being stirred or tumbled.

One of the most widely roasted food products is coffee, and for simplicity the remainder of this application will primarily address the roasting of coffee beans. Those skilled in the art will recognize, however, that the present invention is equally applicable to other food products as well as non-food bulk materials that may require heat treatment.

At the present, and practically for as long as coffee has been consumed, green coffee beans are roasted in a hot environment, e.g. a flow of hot air, of the appropriate temperature, for example in the vicinity of about 700° F. As roasting progresses, moisture in the beans is first evaporated, volatiles are driven off, and the beans begin to change color while oils accumulate on the surface of the beams. The roasting of coffee beans is supervised by a roastmaster, who monitors the progress of the roast and, based on experience, terminates it when he judges the beans to have the "right color". The determination of what the color of the coffee beans should be to attain optimal taste and aroma, and what it actually is during the roasting process, is done subjectively by the roastmaster.

As a result, there will almost invariably be differences in the extent to which beans are roasted, both from one batch to the next, even though they are supervised by the same roastmaster, and how different roastmasters determine the end point for the roasting process. Further, each locality where coffee beans are roasted requires its own roastmaster.

This limits the market for a given roasting plant and therewith its size since roasted coffee, and particularly premium coffee, has a limited shelf life which prevents it from being shipped over long distances, warehousing and the like. Thus, multiple, geographically dispersed, relatively small roasting plants are common in today's coffee industry. Uniform quality, however, is difficult to attain because the determination of the roasting process depends on the subjective judgment and decisions of different roastmasters at the plants.

The uniformity of roasting would be greatly enhanced if the roasting end point could be objectively determined. It is generally agreed that the color of the roasted product, e.g. coffee beans, is the best indicator when roasting should end. Instruments, such as spectrometers and reflectometers, are well known and can be used for objectively establishing the color of objects. However, such instruments are difficult to use in bulk processes because the individual particles of the bulk, e.g. the coffee beans, are in constant motion.

For example, to measure the color of coffee beans with a reflectometer it was thought necessary to position an individual coffee bean immediately in front of the reflectometer to prevent differences in the distance between any given bean and the reflectometer from resulting in inaccurate readings. Selecting individual beans and analyzing their color, however, is impractical because it is time consuming and the remainder of the beans continue to be roasted so that, by the time the color of the bean in question has been established, the color of the remaining beans, and therewith their aroma, may have already changed.

Because of these difficulties, the roasting of coffee beans (and other food products) has not changed much over time. Relatively small batches are roasted, one at a time, and a roastmaster subjectively determines when roasting should end. Thus, the coffee roasting industry continues to be a fragmented industry of many small operators characterized by a lack of uniformity in the way the beans are roasted and their ultimate aroma is established.

SUMMARY OF THE INVENTION

The present invention objectively determines the color of the roasted product in real time and ends the roasting process at the instant when optimal characteristics have been reached. Optimal coffee aroma is thereby assured and can be replicated whenever and wherever desired without requiring the attendance of an experienced roastmaster. Coffee quality is thereby enhanced at a cost less than what it costs to roast coffee in accordance with past methods with their inherent quality inconsistencies.

One way in which this can be achieved is by limiting the optical observation of the beans within a given observation area in the roasting vessel, e.g. drum, to a particular characteristic of the bean, i.e. its surface color, while preventing other factors, such as differences in the relative positions of the beans within the observation area, from affecting the observation. Instrumentation required therefor is relatively simple and rugged yet has the needed sensitivity to detect the aroma changes caused by even small color changes in the beans.

For example, a suitable instrument which is insensitive to changes in the light reflected by the beans as a result of differences in the relative positions of the beans is a reflectometer which takes advantage of the inverse of the so-called search-light principle.

Briefly, and with reference to FIG. 3, according to the searchlight principle, when a source S is placed at the focal point of lens L, an image S' will be located at infinity. Since S subtends an angle $\alpha$ from L, the image S' will also subtend at an angle $\alpha$. Now the illumination at a point on the axis will be determined by the brightness of the image and the solid angle subtended by the image. Thus, for points near the lens, the illumination is given by $E=TB \ \Omega$. B represents the brightness of source S (since the brightness of an image equals the brightness of the object), and $\Omega$ represents the solid angle subtended by the image. For a point at lens L, it is obvious that the solid angle $\Omega$ subtended by the image S is exactly equal to the solid angle subtended by the source S from the lens. Since S' is at infinity, this angle will not change as the reference point is shifted a short distance along the axis away from the lens, and the illumination will remain constant in this region. However, at a distance D equal to the lens diameter divided by α, the source image will subtend the same angle as the diameter of the lens. At points more distant than D, the size of the solid angle subtended by the source of illumination will be limited by the lens diameter. This solid angle will be equal to the area of the lens divided by $d_2$ (d=the distance from the lens) and the illumination beyond distance d will fall off with the square of the distance d to the lens. Accordingly, illumination within the searchlight cone defined by the lens focal point is constant anywhere within the cone. The above information may be found in *"Modern Optical Engineering—The Design Of Optical Systems"* by Warren J. Smith, pp. 203–206, McGraw Hill Book Company (1966).

In such a reflectometer, monochromatic, e.g. laser, light is directed towards the beans being roasted and into an observation area (or volume) thereof. The remainder of the instrument is configured so that the amount of light reflected by the beans and detected by it is independent of the relative position of any given bean in the observation volume by placing a photo or radiation detector of the reflectometer at the infinity focal point of a lens. The lens diameter, its focal length, and the effective diameter of the radiation detector are selected and arranged so that they define the desired observation volume on the side of the lens opposite the detector. Laser light reflected off a bean at any place within the observation volume will have the same light reflection characteristic, e.g. intensity.

Other instruments adapted to accurately determine the color of the beans during roasting independent of the relative positions of the beans and/or as a result of their motion can of course be substituted for the reflectometer described in the preceding paragraph. However, the latter is believed to be particularly suitable and cost effective for this purpose.

In a preferred embodiment of the invention, a continuous or intermittent flow of coffee beans of the batch being roasted is directed past a convenient location, say proximate a window which permits viewing of the roasting machine interior from the exterior thereof. The reflectometer is positioned exteriorly of that window so that the observation volume of the reflectometer intercepts the flow of beans.

It is presently preferred to choose a light source for the reflectometer which emits light of a wavelength at which the light reflected off the beans exhibits maximum activity. For example, most coffee beans are roasted to a color which lies in a range between approximately 720–760 nm. For such an application a light source is selected which has a wavelength at which maximum rates of change occur in the light reflected by the beans. For coffee bean roasting, an infrared laser lasing at a wavelength of about 790 nm has shown optimal results.

As the color of the coffee beans approaches the desired color of, say, 730 nm, increasing amounts of the infrared laser light are absorbed, decreasing the intensity of the light reflected by the beans correspondingly. Such a marked drop in the intensity of the reflected light is relatively easily and accurately detectable and facilitates the determination when roasting should end. When this point has been reached, the reflectometer generates a signal which is used to instantly terminate roasting.

Changes in light reflections not associated with bean colors can be caused by oil films which typically form on the surface of the beans, especially coffee beans, during roasting. To neutralize such reflections, a linearly polarized light source such as a diode laser is used in the reflectometer, and a cross polarizer is placed between the lens and the radiation detector. As a result, the reflectometer is sensitive to only the linearly polarized light reflected off the beans.

Thus, the present invention makes it possible to monitor the roasting of coffee beans and to objectively and accurately determine in real time when the optimal roasting conditions have been reached. At that instant the roasting ends. This assures uniform roasted product quality and enables the adoption of automated roasting processes which can be replicated anywhere at any time and with minimal or no supervision.

DESCRIPTION OF THE PREFERRED EMBODIMENTS

Figure 2:
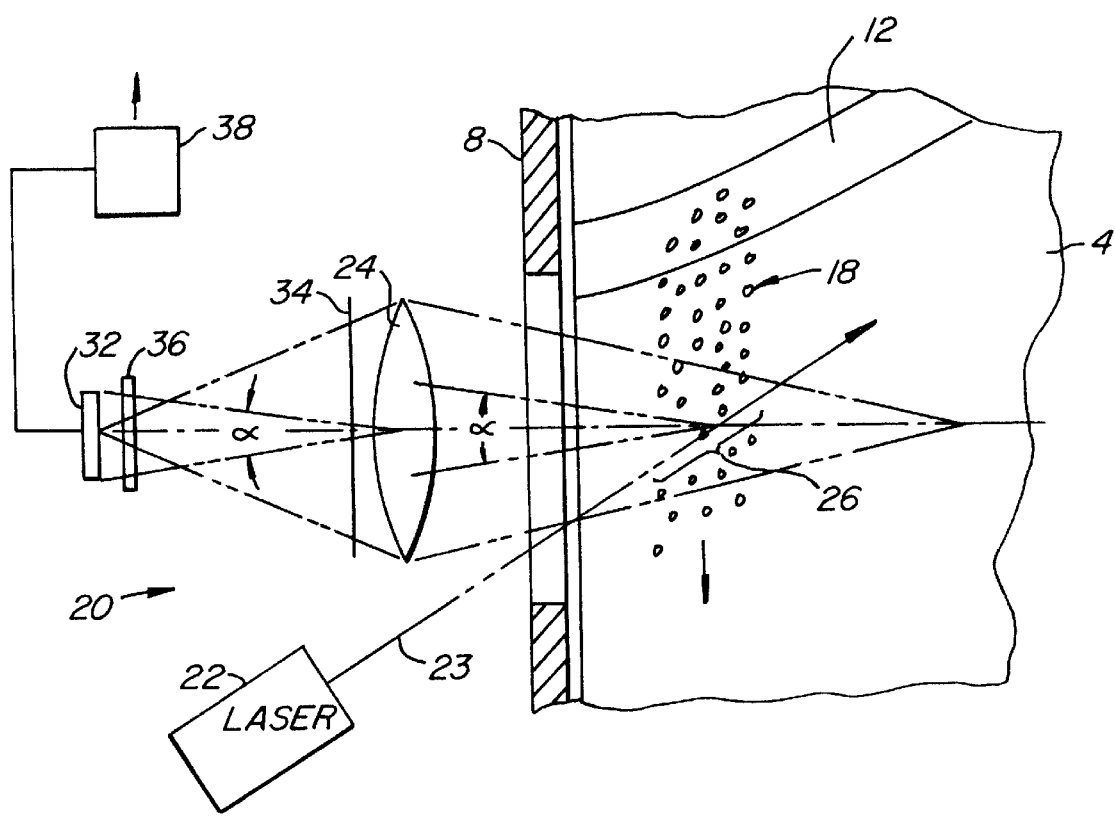
FIG. 2 is a fragmentary, schematic, side elevational view, in section, taken along line 2—2 of FIG. 1 and illustrates a stream of coffee beans in the roasting drum being monitored by a reflectometer that is insensitive to relative bean positions within a designated area of observation.

Referring to the drawings, a schematically illustrated coffee bean roasting drum 2 has concentric, inner and outer drums 4, 6. The outer drum is cylindrical, stationary and sealed to the exterior. An upright front plate 8 is fixed and may be bolted, for example, to a frame (not shown) of a roasting machine. The outer drum forms a horizontal tubular chamber that extends rearwardly (to the right as seen in FIG. 2).

The inner drum is perforated and is mounted on a drum shaft 10 that rotates in bearings (not separately shown) in front plate 8 and at a suitable location (not shown) towards the aft end of the drum.

The inner drum may include a plurality of elongated, generally longitudinally extending vanes 12 that project perpendicular to and radially inwardly from the inner drum wall and extend along a thread-like or helical line over the length of the inner drum. For example, three such vanes may be equally spaced about the inside of the inner drum.

The front plate 8 of the drum includes a viewing window 14 through which the interior of the inner drum can be seen from the outside. The front plate may also include a roasted bean discharge chute 16 which is normally closed with a sealed valve or gate (not shown) and through which a batch of beans, following their roasting, can be discharged by opening the gate.

Fresh or green coffee beans are roasted by first placing a batch into the drum, where they come to rest at the bottom of inner drum 4. Hot air of the appropriate temperature, say about 700° F., is suitably introduced into and/or flowed through the drum and the inner drum is rotated. This causes the radially inwardly extending vanes 12 to pick up quantities of beans in a pocket defined by each vane and the portion of the inner drum adjoining the vane. As rotation of the drum continues, the beans in the pocket are lifted upwardly until the vane rises above the axis of shaft 10. At that point, the side of the vane facing the pocket becomes downwardly inclined and the beans roll gravitationally off the vane. The vanes are helically curved so that the sides thereof that form the pocket slope downwardly towards the front plate 8 of the roasting drum. As a result, as the inner drum rotates, the beans in the pocket are urged towards the front plate. Thus, a stream 18 of beans from the elevated vane is intermittently formed just inside viewing window 14 each time the front portion of one of the vanes (with beans in the pocket) rises above the centerline of the shaft.

In the process, the beans in the drum become heated to the roasting temperature and as roasting continues they undergo a gradual color change. Coffee beans change from an initial gray-green color of the green beans to increasingly dark shades of brown of the roasted beans. To a large extent the aroma of the coffee bean depends on the degree to which it has been roasted, which in turn causes it to have a corresponding color.

Prior to initiating roasting, the degree to which the beans are to be roasted is established on the basis of the bean color required therefor. For example, for a given bean type and coffee aroma, the roastmaster may determine that the beans should be roasted until they have a color which corresponds to a wavelength of, say, 735 nm.

A schematically illustrated reflectometer 20 monitors the color change of the beans. The reflectometer has a light source 22, for example an infrared laser lasing at a wavelength of about 780 to 790 nm, having a beam diameter of between about 1/16" to 1/8" and a power of in the range of about 3 to 5 milliwatts.

The laser beam 23 is obliquely directed into the interior of inner drum 4 through viewing window 14 so that it intercepts the bean flow 18. This forms an observation volume 26, actually a volume of space formed by the beam diameter and the length of the beam between the boundaries of the bean stream, where the beam can strike a bean. Light is reflected off the bean back out through viewing window 14, and it will have one or more characteristics, such as its intensity or strength, which, amongst others, are functions of the color of the bean surface. The intensity of the reflected light can be a function of the color of the bean, at least at certain wavelengths, because the reflectivity of the surface of the bean changes with its color.

Reflectometer 20 includes a lens 24 positioned outside window 14, a photo or radiation detector 32, as well as a cross polarizer 34 and a narrow band filter 36 between the lens and the detector.

Figure 3:
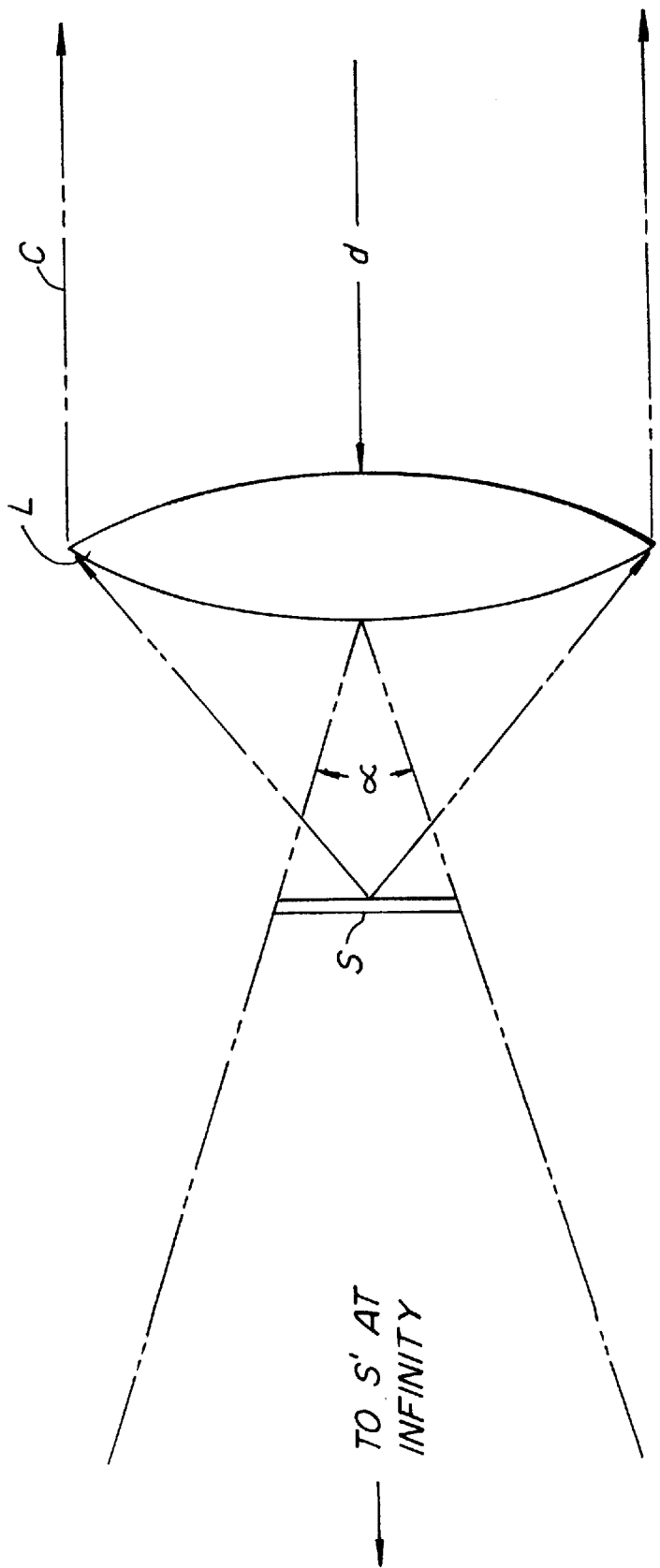
FIG. 3 is a schematic diagram illustrating the optics of a searchlight in accordance with the searchlight principle.

Reflectometer 20 applies the inverse of the searchlight principle. Light reflected off items within the collimated view of the searchlight, which is defined by the diameter of the lens and is represented by cylinder C in FIG. 3, focuses at the focal point of the lens. Thus, light reflected from objects within the cylinder defined by the lens diameter will come to focus at the lens focal point. Placing a detector at or near that focal point will result in maximum collection of reflected light.

The laser is preferably an infrared, e.g. diode, laser that emits a collimated, linearly polarized light beam 23 having a 790 nm wavelength (for coffee roasting) and forms a near perfect point source. A coffee bean struck by the laser beam reflects light towards lens 24. The amount of light energy collected by the lens is independent of the relative location of the bean so long as the bean is within the observation area, provided the lens and radiation detector are constructed and arranged as earlier stated.

The reflected energy will be a function of the reflectivity of the bean when the intensity of the laser beam is constant, which in turn is an excellent indicator of the color of the bean and the degree to which it has been roasted.

Any specular reflections of the beans in the observation area caused by surface films of oil or moisture will be non-polarized and are removed by cross polarizer 34 so that they cannot affect the reading of the radiation detector.

To eliminate all other light, except for the laser light, from affecting radiation detector 32, a narrow band filter 36 is preferably placed in front of the photodetector.

The photodetector 32 of the reflectometer generates an output signal which is a function of the intensity of the light reflected by the beans and as such is indicative of the color of the beans. The output signal is further processed in a processor 38 and is used to end the roasting process when the desired color, e.g. 735 nm, has been reached. It will be understood, however, that the cut-off point can be at any other desired wavelength.

Figure 1:
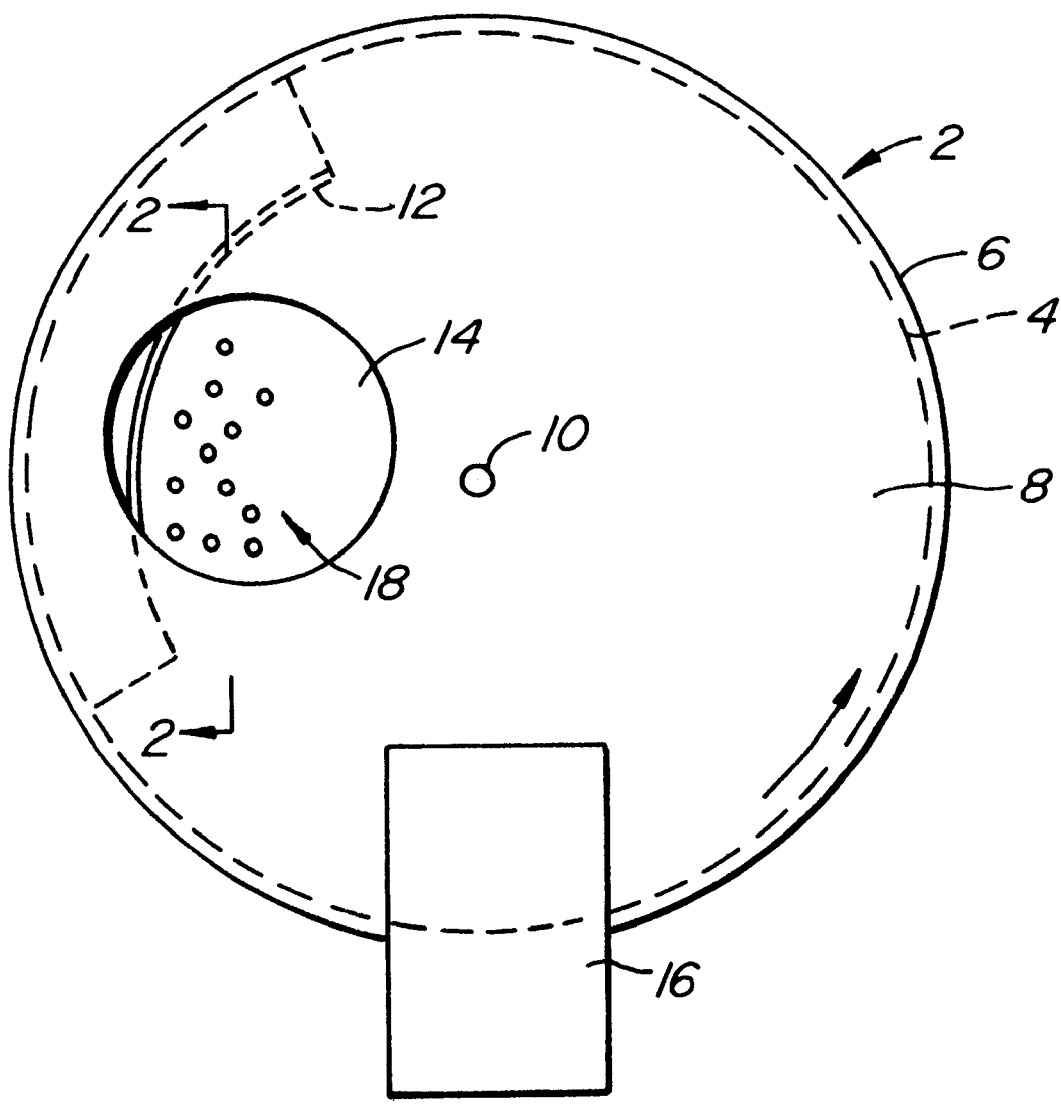
FIG. 1 is a fragmentary, front elevational view of a coffee roasting drum.

The present invention is of course not limited to the specific embodiment shown in FIGS. 1 and 2. For example, the roasting drum can be constructed differently and, if deemed advantageous, a chute or channel (not shown) can be provided for guiding the beans to form the bean stream 18 past the viewing window. Moreover, the reflectometer will include the necessary electronics for processing the output signal of the photodetector. Thus, it may, for example, include an integrator to convert voltage output signals of the photodetector into current signals, and an inverter (to invert the output signal from the detector). Appropriate displays may be included for providing a visual output of the change in reflectivity and, thereby, the color of the beans. Further, the processor of the reflectometer is suitably connected with the controls for the roasting drum (not shown) to terminate roasting and discharge the beans from the drum at the roasting end point.

What is claimed is:

1. A method of heat-treating bulk material formed by a multiplicity of individual moving particles comprising directing a light beam into an observation volume of the material and generating light reflections off at least one particle in the observation volume; identifying a characteristic of the light reflections which is indicative of a desired extent to which the material is to be heat-treated; subjecting the material to a heated environment and thereby heat-treating it; monitoring the light reflections for the characteristic; and terminating subjecting the material to the heated environment in response to detecting the characteristic of the light reflections.

2. A method according to claim 1 wherein the material comprises coffee beans.

3. A method according to claim 1 including preventing an occurrence of changes in the light reflections resulting from differences in the position of the particles in the observation volume.

4. A method according to claim 3 wherein the preventing comprises providing an optical arrangement for monitoring the light reflections and which results in constant light reflections caused by the light beam from any particle in the observation volume irrespective of its relative position therein.

5. A method of roasting coffee beans and objectively terminating the roasting in real time at substantially the instant when the beans have reached a desired degree of roasting comprising heating the beans; forming a flow of beans as the beans are being heated; illuminating an observation volume of the flow with laser light of a predetermined wavelength to thereby generate light reflections off the beans in the observation volume; collecting some of the light reflections from the beans in a manner which limits variation in the light reflections to variations caused by changes in a surface characteristic of the beans; establishing a characteristic of the light reflections which is indicative that the beans have been roasted to a desired extent; and terminating roasting when the light reflections substantially exhibit the established characteristic for the light reflections.

6. A method according to claim 5 including illuminating the observation volume with linearly polarized laser light, and removing from the light reflections non-polarized light reflected off the beans.

7. A method according to claim 5 wherein the laser light has a wavelength of substantially 790 nm.

8. A method according to claim 5 including determining an intensity of the collected light reflections, wherein establishing comprises establishing a predetermined intensity of the light reflections as indicative when the beans have been roasted to the desired extent, and wherein terminating roasting comprises terminating the roasting substantially at the instant when the intensity of the light reflections corresponds to the predetermined intensity.

* * * * *